US009066191B2

(12) United States Patent
Strauss et al.

(10) Patent No.: US 9,066,191 B2
(45) Date of Patent: Jun. 23, 2015

(54) APPARATUS AND METHOD FOR GENERATING FILTER CHARACTERISTICS

(75) Inventors: Michael Strauss, Ilmenau (DE); Thomas Korn, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1265 days.

(21) Appl. No.: 12/936,456

(22) PCT Filed: Apr. 9, 2009

(86) PCT No.: PCT/EP2009/002654
§ 371 (c)(1), (2), (4) Date: Dec. 22, 2010

(87) PCT Pub. No.: WO2009/124772
PCT Pub. Date: Oct. 15, 2009

(65) Prior Publication Data
US 2011/0103620 A1 May 5, 2011

(30) Foreign Application Priority Data
Apr. 9, 2008 (DE) ........................ 10 2008 018 029

(51) Int. Cl.
*H04B 3/00* (2006.01)
*H04S 7/00* (2006.01)
(Continued)

(52) U.S. Cl.
CPC . *H04S 7/303* (2013.01); *H04S 3/00* (2013.01); *H04R 3/12* (2013.01); *H04R 1/403* (2013.01)

(58) Field of Classification Search
CPC .... H04S 7/303; H04R 27/00; H04R 2217/03; H04R 5/04; H04R 3/00; H04R 3/12; H04R 1/403
USPC .......... 381/77, 150, 310, 387, 97, 98, 89, 59, 381/303
See application file for complete search history.

(56) References Cited

U.S. PATENT DOCUMENTS 5,774,562 A 6/1998 Furuya et al.
6,198,829 B1 3/2001 Fink et al.
(Continued)

FOREIGN PATENT DOCUMENTS

WO WO 97/03438 1/1997

OTHER PUBLICATIONS

Bavu, et al.; "Subwavelength Sound Focusing Using a Time Reversal Acoustic Sink"; Sep./Oct. 2007; Acta Acustica United with Acustica, vol. 93, pp. 706-715.
(Continued)

*Primary Examiner* — Vivian Chin
*Assistant Examiner* — Con P Tran
(74) *Attorney, Agent, or Firm* — Perkins Coie LLP; Michael A. Glenn

(57) ABSTRACT

An apparatus for generating filter characteristics for filters connectible to at least three loudspeakers at defined locations with respect to a sound reproduction zone includes an impulse response reverser for time-reversing impulse responses associated to the loudspeakers to obtain time-reversed impulse responses. The apparatus furthermore includes an impulse response modifier for modifying the impulse responses or the time-reversed impulse responses such that impulse response portions occurring before a maximum of a time-reversed impulse response are reduced in amplitude to obtain the filter characteristics for the filters.

17 Claims, 11 Drawing Sheets

(51) Int. Cl.
*H04S 3/00* (2006.01)
*H04R 3/12* (2006.01)
*H04R 1/40* (2006.01)

(56) References Cited

U.S. PATENT DOCUMENTS

| | | | | |
|---|---|---|---|---|
| 2001/0001603 | A1 | 5/2001 | Fink et al. | |
| 2005/0273008 | A1 * | 12/2005 | Montaldo et al. | 600/437 |

OTHER PUBLICATIONS

Berkhout, A.J.; "A holographic approach to acoustic control"; Dec. 1998; Journal of the Audio Engineering Society, 36(12): pp. 977-995.

Elliot, S. et al.; "A Multiple Error LMS Algorithm and Its Application to the Active Control of Sound and Vibration"; Oct. 1987; IEEE Transactions on Acoustics. Speech and Signal Processing, (10), pp. 1423-1434.

Fink, M. et al.; "Time-reversed acoustics";Dec. 2000, vol. 63, pp. 1933-1995-. XP002537584, retrieved from the Internet: URL:http://dx.doi.org/10.1088/0034-4885/63/12/202>, p. 1964-p. 1978.

Gauthier, P.A. et al.; "Sound-field reproduction in-room using optimal techniques: Simulations in the frequency domain"; Feb. 2005; Acoustical Society of America Journal, 117: pp. 662-678.

Heinemann M G et al: "Acoustic communications in an enclosure using single-channel time-reversal acoustics"; Jan. 28, 2002; Applied Physics Letters, AIP, American Institute of Physics, Melville, NY, US, vol. 80, No. 4, 28, pp. 694-696, XP012031421, ISSN: 0003-6951, the whole document.

Longworth-Reed, et al.; "Time-forward speech intelligibility in time-reversed rooms", Dec. 22, 2008, Journal of Acoustical Society of America, vol. 125, No. 1, 22, pp. EL13-EL19, XP002537586, paragraphs (0001), (0004); figure 1.

Nelson, P.A. et al.; "Inverse Filter Design and Equalization Zones in Multichannel Sound Reproduction"; May 1995; IEEE Transactions on Speech and Audio Processing, 3(3), pp. 185-192.

Verheijen, E.N.G.; "Sound Reproduction by Wave Field Synthesis", Jan. 1998; PhD Thesis, Delft University of Technology, 189 pages.

Yon, S. et al.: "Sound focusing in rooms: The time-reversal approach", Mar. 1, 2003; Journal of the Acoustical Society of America, AIP / Acoustical Society of America, Melville, NY, US, vol. 113, No. 3, pp. 1533-1543, XP012003364, ISSN: 0001-4966, abstract; figure 4.

Yon, S. et al.: "Sound focusing in rooms. II. The spatio-temporal inverse filter"; Dec. 2003; Journal of Acoustical Society of America, (online), vol. 114, No. 6, pp. 3044-3052, XP002537585, retrieved from the Internet: URL://http://dx.doi.org/10.1121/1.1628247> the whole document.

International Search Report and Written Opinion, mailed Jul. 31, 2009, in related PCT patent application No. PCT/EP2009/002654, 15 pages.

* cited by examiner $$Q_m(r,\omega) = S(\omega)\sqrt{\frac{jk}{2\pi}}\sqrt{\frac{\Delta z_0}{z_0 + \Delta z_0}}\cos\varphi \; \frac{\exp(-jkr)}{\sqrt{r}}$$

$$Q_m^{foc}(r,\omega) = S(\omega)\sqrt{\frac{k}{2\pi j}}\sqrt{\frac{\Delta z_0}{z_0 + \Delta z_0}}\cos\varphi\ \frac{\exp(-jkr)}{\sqrt{r}}$$

$$x(t)\otimes h_i(t) = y_i(t), \qquad i = 1,2,\ldots,N$$

$$\sum_{i=1}^{N}\{y_1(-t)\otimes h_i(t)\} = \sum_{i=1}^{N}\{x(-t)\otimes h_i(-t)\otimes h_i(t)\} =$$
$$\sum_{i=1}^{N}\{x(-t)\otimes h_{ac,i}(t)\} = r_i(t)$$

APPARATUS AND METHOD FOR GENERATING FILTER CHARACTERISTICS

CROSS-REFERENCE TO RELATED APPLICATION

This application is a U.S. National Phase entry of PCT/EP2009/002654 filed Apr. 9, 2009, and claims priority to German Patent Application No. 102008018029.7 filed Apr. 9, 2008, each of which is incorporated herein by references hereto.

BACKGROUND OF THE INVENTION

The present invention is related to audio technology and, in particularly, to the field of sound focusing for the purpose of generating sound focusing locations in a sound reproduction zone at a specified position such as a position of a human head or human ears.

When taking a look at the whole field of acoustics, the term "sound focusing" is referred in context to very different applications. Underwater acoustic communication, ultrasonic medical diagnostics, non-invasive lithotripsy, non-destructive material testing are only a handful of possible use cases.

From the view of audio reproduction, focusing is an attractive method for generating outstanding perceivable effects. On the one hand sound focusing provides possibilities for creating virtual acoustic reality, for example for holophonic audio reproduction methods. On the other hand there is high potential for facilitating spatially selective audio reproduction which opens the door to individual or personal audio which is a focus of the present invention.

Personal sound zones can be used in many applications. One application is, for example, that a user sits in front of her or his television set, and sound zones are generated, in which sound energy is focused, and which are placed in the position, where the head of the user is expected to be placed when the user sits in front of the TV. This means that in all other places, the sound energy is reduced, and other persons in the room are not at all disturbed by the sound generated by the speaker setup or are disturbed only to a lesser degree compared to a straightforward setup, in which sound focusing is not performed to take place at a specified sound focusing location.

Other useful applications are public information facilities, in which a sound zone can be generated in front of a public announcement facility so that only persons being in front or in the specified position of the announcing facility can understand the information from the facility and other persons which are not positioned in the sound focusing zones cannot understand the announced information.

Other applications are privacy applications without headphones. In a very good sound focusing application, a user can receive his or her personal information by straightforward loudspeakers, but only the user will understand the information and other persons in the room will not understand the information, since they are not in the sound focusing zones.

Further applications are in the field of entertainment. Specifically, users are interested to watch the movie on a small display such as a laptop display or even a mobile phone or mobile player display, and the user is interested to place the device in front of the user, for example on the table. Sound focusing allows that the sound is concentrated where the user is located which means that even with smaller speakers, nevertheless satisfying volumes can be generated around the user's ears. Furthermore, even when the user is using a mobile phone in a straightforward way, the sound focusing directed to an expected placement of the ear of the user will allow to use smaller speakers or to use less power for exciting the speakers so that, altogether, battery power can be saved due to the fact that the sound energy is not radiated in a large zone but is concentrated in a specific sound focusing location within a larger sound reproduction zone. Naturally, more loudspeakers consume more power, but the concentration of power at a focusing zone necessitates less battery power compared to a non-focused radiation using the same number of speakers.

Sound focusing even allows to place different information of different locations within a sound reproduction zone. Exemplarily, a left channel of a stereo signal can be concentrated around the left ear of the person and a right channel of a stereo signal can be concentrated around the right ear of the person.

Furthermore, completely different information can be reproduced within a sound reproduction zone at spatially different locations by using the same loudspeaker setup, where only a small or even no crosstalk between these sounds can be realized.

There exist several sound focusing applications. One sound focusing application is a numerical calculation of an inverse filter using a ME-LMS-optimization. (ME-LMS=multiple error least mean square). The ME-LMS algorithm is used as a method for inverting a matrix occurring in the calculation. An arrangement consisting of N transmitters (loudspeakers) and M receivers (microphones) can be represented in a mathematical way using a system of linear equations having a size M×N. When the positions of the speakers and microphones are known, the unique relation between the input and the output can be found by calculating a solution of the wave equation in a respective coordinate system such as the Cartesian coordinate system. By providing a desired solution such as sound pressure at (virtual) microphone positions it is possible, to calculate the input signals into loudspeakers, which are derived from an original audio signal by respective filters for the loudspeakers.

The calculation of the solution of such a multi-dimensional linear system of equations can be performed using optimization methods. The multiple element least mean square method is a useful method which, however, has a bad convergence behavior, and the convergence behavior heavily depends on the starting conditions or starting values for the filters.

The time-reversal process is based on a time reciprocity of the acoustical sound propagation in a certain medium. In such a situation, the sound propagation from a transmitter to a receiver is reversible. If sound is transmitted from a certain point and if this sound is recorded at a border of the bounding volume, sound sources on the volume can reproduce the signal in a time-reversed manner. This will result in the focusing of sound energy to the original transmitter position.

Time-reversal mirror (TRM) generates sound focusing in a single point. The target is to have a focus point which is as small as possible and which is, in a medical application, directly located on for example a kidney stone so that this kidney stone can be broken by applying a large amount of sound to the kidney stone.

Other effects are the model-based control of a loudspeaker array. One model-based approach is beam forming. Particularly, beam forming means the intended change of a directional characteristic of a transmitter or receiver group. The coefficients/filters for these groups can be calculated based on a model. The directed radiation of a loudspeaker array can be obtained by a suitable manipulation of the radiated signal individually for each loudspeaker. By using loudspeaker specific digital coefficients which may include a signal delay and/or a signal scaling, the directivity is controllable within certain limits. One can create the focus zone, when the signal propagation delay between loud speakers and the intended focus zone is inverted and when this inverted signal delay is used as loudspeaker-specific signal delay of the audio signal for each loudspeaker channel. This distribution of delay coefficients and the choice of the loudspeaker-specific signal values or, stated in general, the choice of the loudspeaker-specific transfer functions influences the focus zone.

Other model-based methods are wave field synthesis or binaural sky. Model-based is related to the way of generating the filters or coefficients for wave field synthesis or binaural sky. By performing a loudspeaker-specific signal manipulation, the radiated signal is manipulated in such a way that the superposition of wave field contributions of all loudspeakers results in an approximated image of the sound field to be synthesized. This wave field allows a positionally correct detection of a synthesized sound source in certain limits. In the case of so-called focused sources, one will perceive a significant signal level increase close to the position of a focused source compared to an environment of the source at a position not so close to the focus location. Model-based wave field synthesis applications are based on an object-oriented controlled synthesis of the wave field using digital filtering including calculating delays and scalings for individual loudspeakers.

Binaural sky uses focused sources which are placed in front of the ears of the listener based on a system detecting the position of the listener. Beam forming methods and focused wave field synthesis sources can be performed using certain loudspeaker setups, whereby a plurality of focus zones can be generated so that signal or multi-channel rendering is obtainable. Model-based methods are advantageous with respect to calculation resources, and these methods are not necessarily based on measurements.

The publication "Time-reversal of ultrasonic fields—Part I: basic principles", M. Fink, IEEE transactions on ultrasonic, ferroelectric, and frequency control, Vol. 39, #5 Sep. 1992 discusses the time-reversal focusing technique in detail.

The technical publication "The binaural sky: A virtual headphone for binaural room synthesis" D. Menzel et al., IRT Munich Report, 2005, available under http://www.tonmeister.de/symposium/2005/np pdf/RQ4.pdf discloses a system for the reproduction of virtual acoustics in theory and practice. The system combines wave field synthesis, binaural techniques and transaural audio. A stable location for of virtual sources is achieved for listeners that are allowed to turn around and rotate their heads. A circular array located above the head of the listener, and FIR filter coefficients for filters connected to the loudspeakers are calculated based on azimuth information delivered by a head-tracker.

WO 2007/110087 A1 discloses an arrangement for the reproduction of binaural signals (artificial-head signals) by a plurality of loudspeakers. The same crosstalk canceling filter for filtering crosstalk components in the reproduced binaural signals can be used for all head directions. The loudspeaker reproduction is effected by virtual transauralization sources using sound-field synthesis with the aid of a loudspeaker array. The position of the virtual transauralization sources can be altered dynamically, on the basis of the ascertained rotation of the listener's head, such that the relative position of the listener's ears and the transauralization source is constant for any head rotation.

It has been found that the TRM method provides useful results for filter coefficients so that a significant sound focusing effect at predetermined locations can be obtained. However, it has also been found that the TRM method, while effectively applied in medical applications for lithotripsy for example has significant drawbacks in audio applications, where an audio signal comprising music or speech has to be focused. The quality of the signal perceived in the focusing zones and at locations outside the focusing zones is degraded due to significant and annoying pre-echos caused by filter characteristics obtained by the TRM method, since these filter characteristics have a long first portion of the impulse response followed by a "main portion" of the filter impulse response due to the time-reversal process.

SUMMARY

According to an embodiment, an apparatus for generating filter characteristics for filters connectible to at least three loudspeakers at defined locations with respect to a sound reproduction zone may have: an impulse response reverser for time-reversing impulse responses associated to the loudspeakers to obtain time-reversed impulse responses, wherein each impulse response describes a sound transmission channel between a location within the sound reproduction zone and a loudspeaker, which has the impulse response associated therewith; and an impulse response modifier for modifying the time-reversed impulse responses or the impulse responses associated to the loudspeakers before inversion, such that impulse response portions occurring before a maximum of a time-reversed impulse response are reduced in amplitude to obtain the filter characteristics for the filters.

According to another embodiment, a method of generating filter characteristics for filters connectible to at least three loudspeakers at defined locations with respect to a sound reproduction zone may have the steps of: time-reversing impulse responses associated to the loudspeakers to obtain time-reversed impulse responses, wherein each impulse response describes a sound transmission channel between a location within the sound reproduction zone and a loudspeaker, which has the impulse response associated therewith; and modifying the time-reversed impulse responses or the impulse responses associated to the loudspeakers before inversion, such that impulse response portions occurring before a maximum of a time-reversed impulse response are reduced in amplitude to obtain the filter characteristics for the filters.

Another embodiment may have a computer program having a program code for performing, when running on a computer, the inventive method.

According to another embodiment, a sound reproduction system may have: an inventive apparatus for generating filter characteristics; a plurality of programmable filters programmed to the filter characteristics determined by the apparatus for generating the filter characteristics; a plurality of loudspeakers at predefined locations, wherein each loudspeaker is connected to one of the plurality of filters; and an audio source connected to the filters.

In accordance with the present invention, the problem related to the pre-echos is addressed by modifying the non-inverted or the inverted impulse response so that impulse response portions occurring before a maximum of the time-reversed impulse response are reduced in amplitude.

In the embodiment, the amplitude reduction of the impulse response portion can be performed without a detection of problematic portions based on the psychoacoustic pre-masking characteristic describing the pre-masking properties of the human ear. However, it is not advantageous to completely attenuate all reflections occurring in the reversed impulse response. The strongest discrete reflections in the reverted or non-reverted impulse responses are detected and each one of these strongest reflections is processed so that—before this reflection—an attenuation using the pre-masking characteristic is performed and, after this reflection, an attenuation using the post-masking characteristic is performed.

In other applications, a detection of problematic portions of the impulse response resulting in perceivable pre-echos is performed and a selected attenuation of these portions is performed. In other embodiments, the detection may result in other portions of the reverted impulse response, which can be enhanced/increased in order to obtain a better sound experience. In such a situation, these are portions of the impulse response which can be placed before or after the impulse response maximum in order to obtain the filter characteristics for the loudspeaker filter.

The modification typically results in a situation that portions before the maximum of the time-reversed impulse response in time have to be manipulated more than portions behind the maximum due to the fact that the typically human pre-masking time span is much smaller than the post-masking time span as known from psychoacoustics.

In a further embodiment, the filter characteristics obtained by time-reversal mirroring are manipulated with respect to time and/or amplitude in a random manner so that a less sharp focusing and, therefore, a larger focus zone is obtained.

Other embodiments obtain a broader focus sound by performing measurements for closely located several focus points. By superposing the focus points, a broader focus zone is obtained.

Other embodiments of the invention relate to a method for generating starting values for the numerical optimization based on time reversal mirroring results. These starting values should be quite close to the final results and, therefore, result in a numerical optimization which will have a good and rapid conversion performance.

Other embodiments of the invention are based on model-based methods for generating the focusing zones. A camera and an image analyzer are used to visually detect the location or orientation of a human head or the ears of a person. This system, therefore, performs a visual head/face tracking and uses the result of this visual head/face tracking for controlling a model-based focusing algorithm such as a beam forming or wave field synthesis focusing algorithm.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
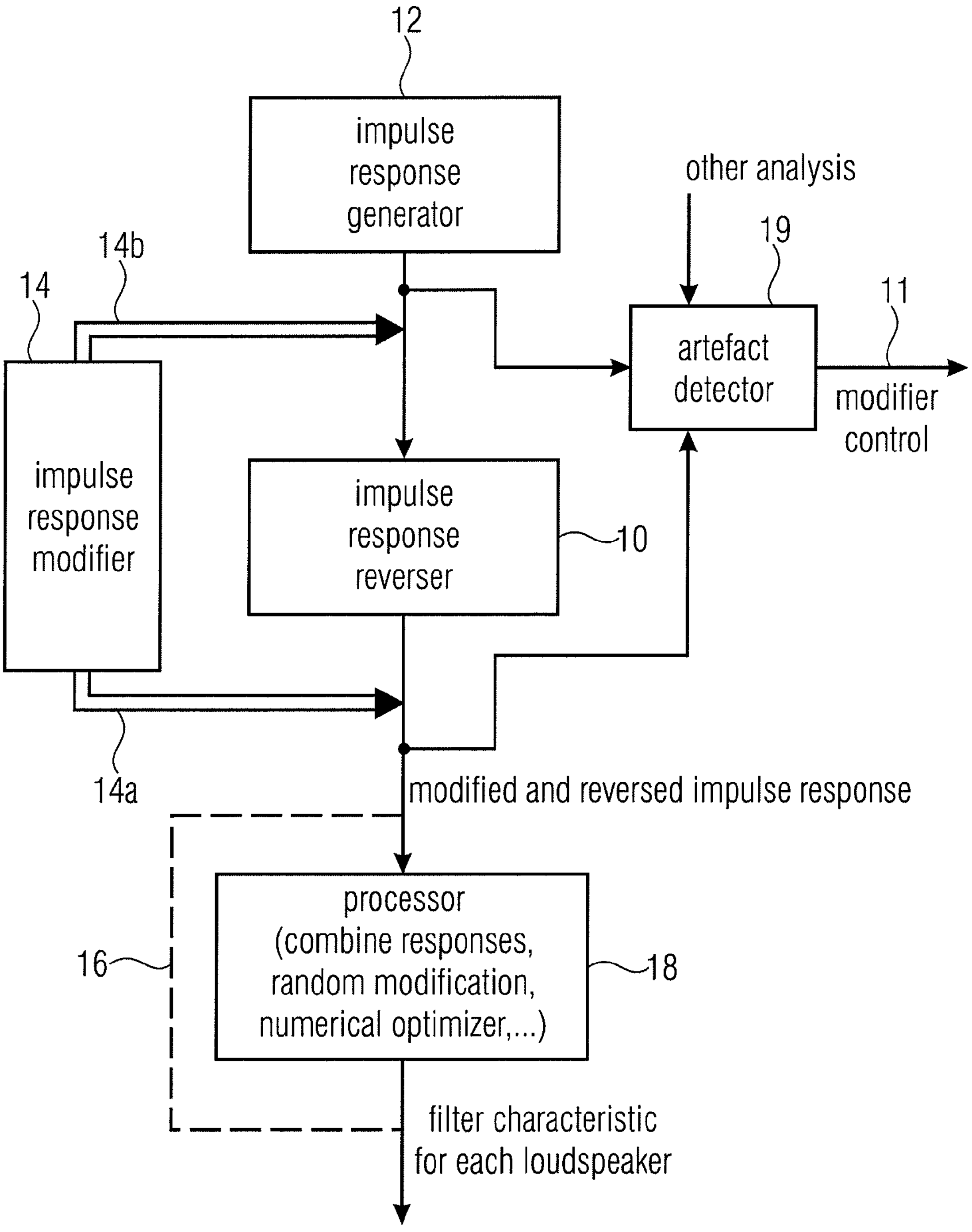
FIG. 1 is an apparatus for generating filter characteristics in accordance with an embodiment.

FIG. 1 illustrates an apparatus for generating filter characteristics for filters connectible to at least three loudspeakers at defined locations with respect to a sound reproduction zone. A larger number of loudspeakers is used such as 10 or more or even 15 or more loudspeakers. The apparatus comprises an impulse response reverser 10. for time-reversing impulse responses associated to the loud speakers. These impulse responses associated to the loud speakers may be generated in a measurement-based process performed by the impulse response generator 12. The impulse response generator 12 can be an impulse response generator as usually used when performing TRM measurements during the measurement task.

The impulse response reverser 10 is adapted to output time-reversed impulse responses, where each impulse response describes a sound transmission channel from a sound-focusing location within the sound reproduction zone to a loudspeaker which has associated therewith the impulse response or an inverse channel from the location to the speaker.

The apparatus illustrated in FIG. 1 furthermore comprises an impulse response modifier 14 for modifying the time-reversed impulse responses as illustrated by line 14*a* or for modifying the impulse responses before reversion as illustrated by line 14*b*.

In an embodiment, the impulse response modifier 14 is adapted to modify the time-reversed impulse responses so that impulse response portions occurring before a maximum of the time-reversed impulse response are reduced in amplitude to obtain the filter characteristics for the filters. The modified and reversed impulse responses can be used for directly controlling programmable filters as illustrated by line 16. In other embodiments, however, these modified and reversed impulse responses can be input into a processor 18 for processing these impulse responses. Ways of processing comprise the combination of responses for different focusing zones, a random modification for obtaining broader focusing zones, or the inputting of the modified and reversed impulse responses into a numeric optimizer as starting values, etc.

In the embodiment, the apparatus comprises an artifact detector 19 connected to the impulse response generator 12 output or the impulse response reverser 10 output or connected to any other sound analysis stage for analyzing the sound emitted by the loudspeakers. The artifact detector 19 is operative to analyze the input data in order to find out, which portion of an impulse response or a time-reversed impulse response is responsible for an artifact in the sound field emitted by the loudspeakers connected to the filters, where the filters are programmed using the time-reversed impulse responses or the modified time-reversed impulse responses. Thus, the artifact detector 19 is connected to the impulse response modifier 14 via a modifier control signal line 11.

Figure 2:
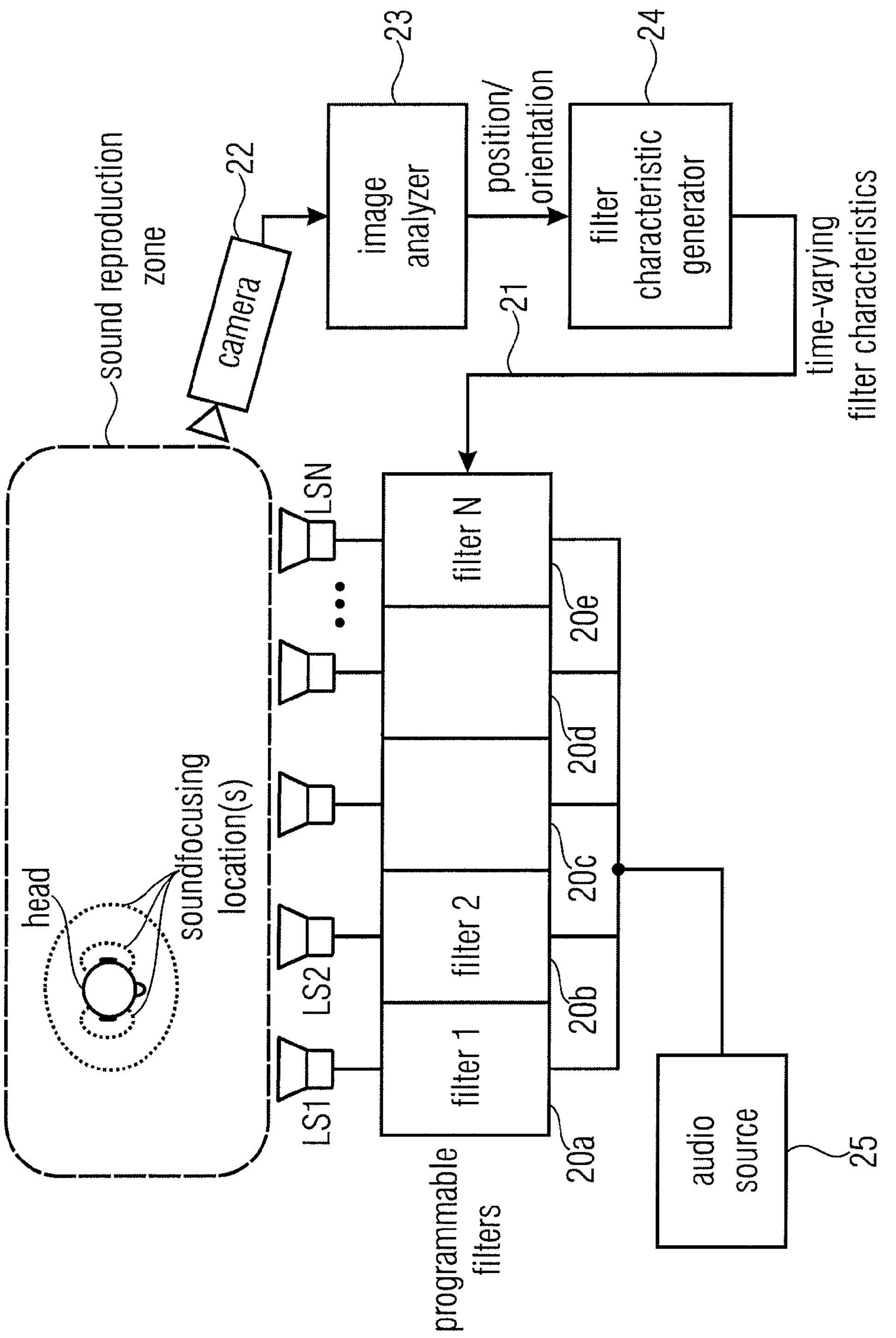
FIG. 2 is a loudspeaker setup together with a visual head/face tracking system in accordance with an embodiment.

FIG. 2 illustrates a sound reproduction system for generating a sound field having one or more sound focusing locations within a sound reproduction zone. The sound reproduction system comprises a plurality of loudspeakers LS1, LS2, . . . , LSN for receiving a filtered audio signal. The loudspeakers are located at specified spatially different locations with respect to the sound reproduction zone as illustrated in FIG. 2. The plurality of loudspeakers may comprise a loudspeaker array such as a linear array, a circular array or even more advantageously, a two-dimensional array consisting of rows and columns of loudspeakers. The array does not necessarily have to be a rectangular array but can include any two-dimensional arrangement of at least three loudspeakers in a certain flat or curved plane. More than three speakers can be used in a two-dimensional arrangement, but can also be used in three-dimensional arrangement.

The sound reproduction system comprises a plurality of programmable filters 20*a*-20*e*, where each filter is connected to an associated loudspeaker, and wherein each filter is programmable to a time-varying filter characteristic provided via line 21. The system comprises at least one camera 22 located at a defined position with respect to the loudspeakers. The camera is adapted to generate images of a head in the sound reproduction zone or of a portion of the head in the sound reproduction zone at different time instants. An image analyzer 23 is connected to the camera for analyzing the images to determine a position or orientation of the head at each time instant.

The system furthermore comprises a filter characteristic, generator 24 for generating the time-varying filter characteristics (21) for the programmable filters in response to the position or orientation of the head as determined by the image analyzer 23. In an embodiment, the filter characteristic generator 24 is adapted to generate filter characteristics so that the sound focusing locations change over time depending on the change of the position or orientation of the head over time.

The filter characteristic generator 24 can be implemented as discussed in connection with FIG. 1 or can alternatively be implemented as discussed in connection with FIG. 5*a* or 5*b*.

The audio reproduction system illustrated in FIG. 2 furthermore comprises an audio source 25, which can be any kind of audio source such as a CD or DVD player or an audio decoder such as an MP3 or MP4 decoder, etc. The audio source 25 is adapted to feed the same audio signal to several filters 20*a*-20*e*, which are associated with specified loudspeakers LS1-LSN. The audio source 25 may comprise additional outputs for other audio signals connected to other pluralities of loudspeakers not illustrated in FIG. 2 which can even be arranged with respect to the same sound reproduction zone.

Figure 3A:
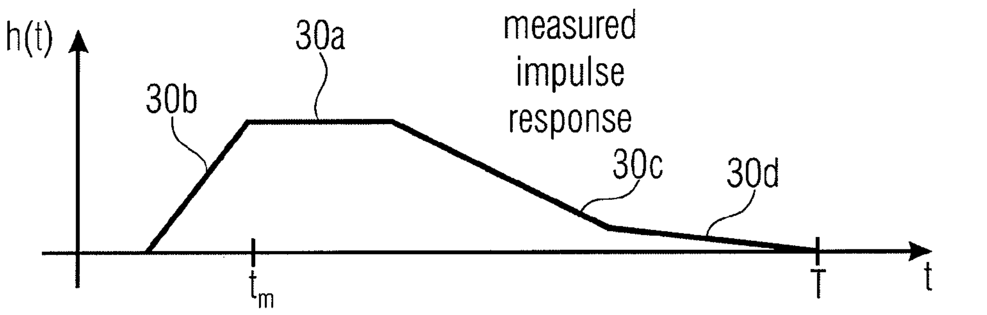
FIGS. 3*a*-3*f* illustrate a measured impulse response, a time-reversed/mirrored impulse response and several modified reversed impulse responses.

FIG. 3*a* illustrates an exemplary impulse response which can, for example, be obtained by measuring transmission channels in a TRM scenario. Naturally, a real impulse response will not have such sharp edges or straight lines as illustrated in FIG. 3*a*. Therefore, a true impulse response may have less pronounced contours, but will typically have a maximum portion 30*a*, a typically rapidly increasing portion 30*b*, which—in an ideal case—will have an infinity increase, a decreasing portion 30*c* and a diffuse reverberation portion 30*d*. Typically, an impulse response will be bounded and will have an overall length equal to T.

Figure 3B:
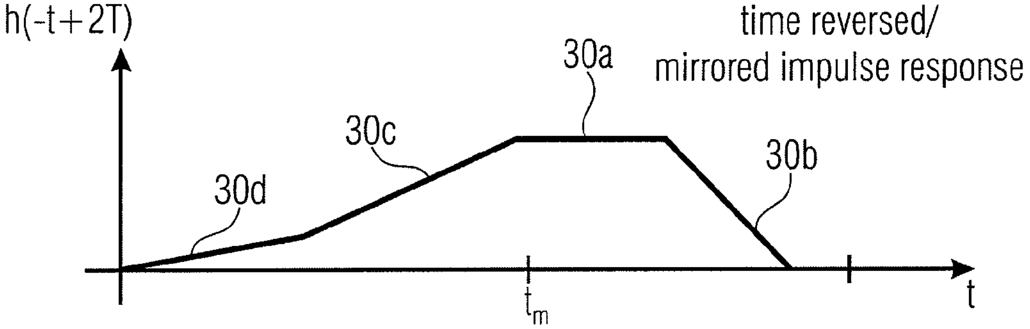

FIG. 3*b* illustrates a time-reversed/mirrored impulse response. The order the different portions remains the same but is reversed as illustrated in FIG. 3*b*. Now, it becomes clear that the maximum portion starts at a time $t_m$ which is later than the start of the maximum portion $t_m$ in FIG. 3*a*.

It has been found that this shifting of the time $t_m$ to a later point in time is responsible for creating the pre-echo artifacts. Specifically, pre-echo artifact are generated by sound reflections in a sound reproduction zone represented by the time-reversed impulse response portions 30*c*, 30*d* in FIG. 3*b*. As additionally illustrated in FIG. 3*b* the time-reversed impulse response is generated by mirroring the FIG. 3*a* impulse response with respect to the ordinate axis which is represented by "−p" in the argument of h in FIG. 3*b*. Then, the mirrored impulse response is shifted to the right by 2T illustrated by "2T" in the argument of h in FIG. 3*b*.

Subsequently, modifications of the impulse response or the time-reversed impulse response are discussed with respect to FIG. 3*c*-3*f*. It is to be emphasized that the modification of the impulse response can take place before or after reversal as illustrated by 14*a* or 14*b* in FIG. 1.

Figure 3C:
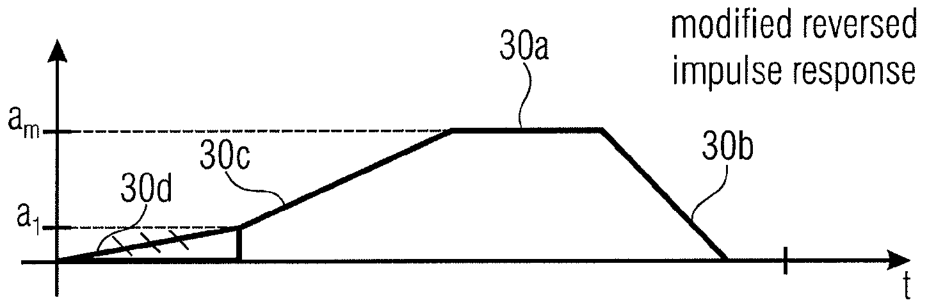

In FIG. 3*c*, the diffuse portion 30*d* is detected and set to 0. This detection can be performed in the artifact detector 19 of FIG. 1 by looking for a portion of the impulse response having an amplitude below a certain critical amplitude $a_1$ as indicated of FIG. 3*c*. This amplitude $a_1$ is smaller than 50% of the maximum amplitude $a_m$ of the impulse response and between 10% and 50% of the maximum amplitude $a_m$ of the impulse response. This will cancel diffuse reflections which have been found to contribute to annoying pre-echoes, but which have also been found to not contribute significantly to the time-reversed mirroring effect. In this embodiment, the impulse response modifier 14 is operative to set to zero a portion of the time-reversed impulse response or the impulse response, the portion extending from a start of the time-reversed impulse response to a position in the time-reversed impulse response, at which an amplitude ($a_1$) of the time-reversed impulse response occurs, which is between 10% to 50% of a maximum amplitude ($a_m$) of the time-reversed impulse response.

The impulse response modifier 14 is operative to not perform a modification which would result in a modification of the time-reversed impulse response subsequent in time to a time ($t_n$) of the maximum ($a_m$), where the portion (30*a*, 30*b*), which should not be modified, has a time length having a value between 50 to 100 ms.

Figure 3D:
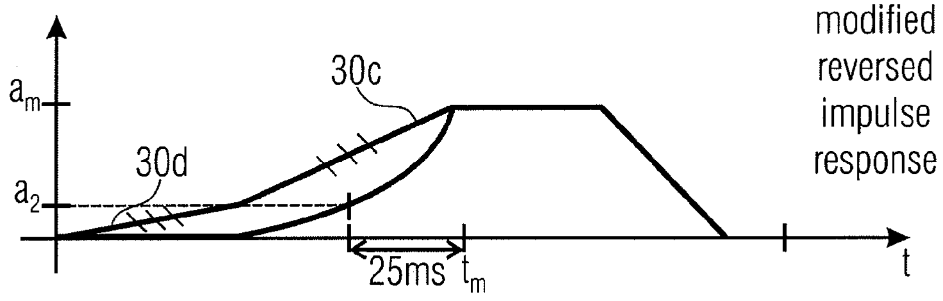
Figure 6:
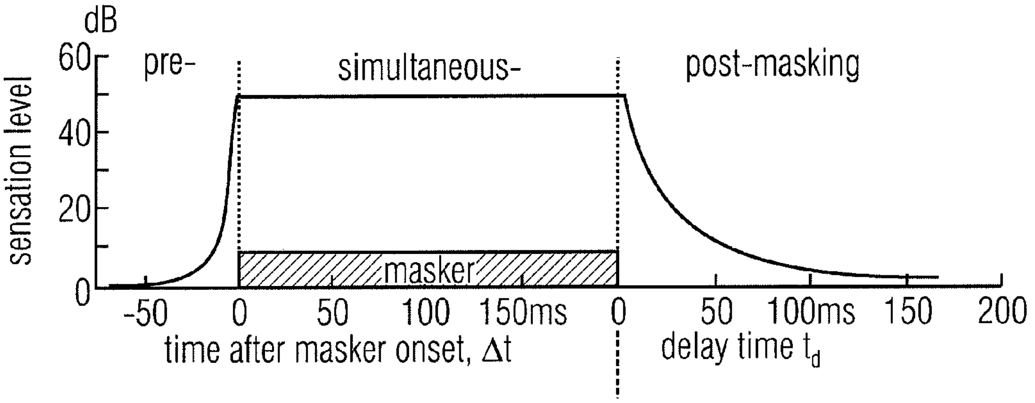
FIG. 6 illustrates a masking characteristic of the human hearing system, on which the impulse response modification can be based.

FIG. 3*d* illustrates further modification, in which alternatively or in addition to a modification of the portion 30*d*, the portion 30*c* is modified as well. This modification is influenced by the psychoacoustic masking characteristic illustrated in FIG. 6. This masking characteristic and associated effects are discussed in detail in "Fastl, Zwicker," Psychoacoustics, Facts and Models, Springer, 2007, pages 78-84. When FIG. 6 is compared to FIG. 3*d*, it becomes clear that, in general, post-masking will be sufficiently long to avoid or at least reduce perceivable post-echoes, since the portion 30*b* of an impulse response will be hidden to a certain degree under the "post-masking" curve in FIG. 6. However, the longer portions 30*c*, 30*d* will not be hidden under the pre-masking curve in FIG. 6, since the time extension of this pre-masking effect is about 25 milliseconds. A difference between the situation in FIG. 6 and the inventive application is that the masker in FIG. 6 is a 200 ms noise signal, and the reflection is shorter than 200 ms. Nevertheless, it has brought perceptible advantages to identify discrete reflections and to attenuate a region before the reflection with a shorter time constant than a regions subsequent to the reflection, where a comparatively longer time constant for attenuation is used. This procedure is repeated for each discrete reflection so that the masking characteristic is applied to each discrete reflection.

Therefore, it has been found out that the modification of the time-reversed impulse response so that portion 30*c* is modified results in a significant reduction of annoying pre-echoes without negatively influencing the sound focusing effect in an unacceptable manner. A monotonically decreasing function such as a decaying exponential function as shown in FIG. 3*d* is used. The characteristic of this function is determined by the pre-masking function. In embodiments, the modification will be such that at 25 milliseconds before time $t_m$, the portion 30*c* will not be close to zero as in the masking curve. However, a reduction of pre-echoes while maintaining the focusing is obtained, when the modification is performed so that at times of 25 milliseconds before the maximum time tm, the time-reversed impulse response has amplitude values with amplitude $a_2$ which are below 50% of the maximum amplitude $a_m$ or even below 10%.

Figure 3E:
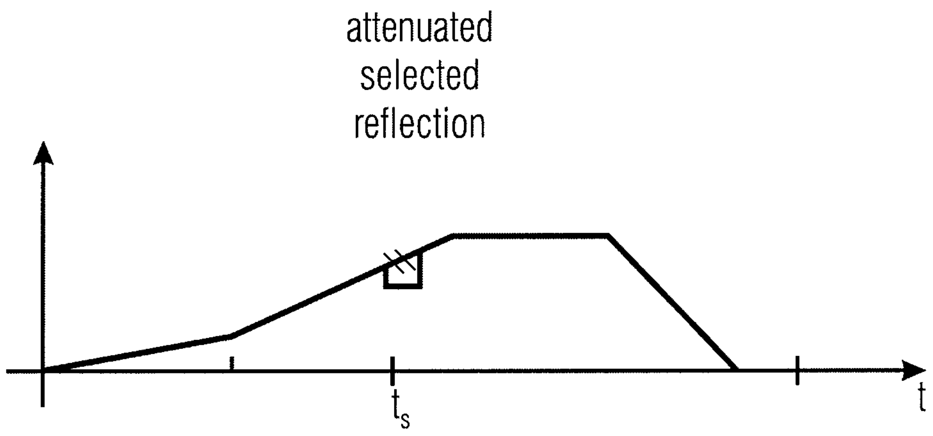
Figure 3F:
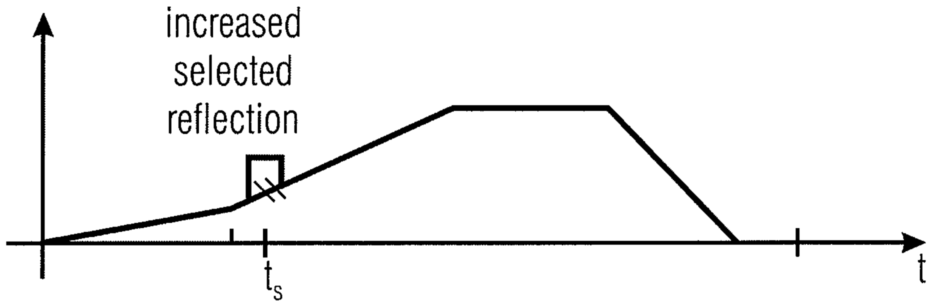

FIG. 3*e* illustrates a situation, in which a selected reflection is attenuated by a certain degree. The time coordinate $t_s$ of the selected reflection in the impulse response can be identified via an analysis indicated in FIG. 1 as "other analysis". This other analysis can be an empirical analysis which can, for example, be based on a decomposition of the sound field generated by filters without attenuated selected reflections. Other alternatives are the setting of empirical attenuations of selected reflections and a subsequent analysis, whether such a procedure has resulted in less pre-echos or not.

Other modifications can even increase selected reflections. The analysis, which reflections are to be amplified and the corresponding time coordinate in the impulse response can be detected in a similar way as discussed in connection with FIG. 3*e*.

In embodiments of the invention, the time impulse responses are modified or windowed in order to minimize pre-echos so that a better signal quality is obtained. However, information encoded in the impulse response (in the filter) timely before the direct signal, i.e. the maximum portion, is responsible for the focusing performance. Therefore, this portion is not completely removed. Instead, the modification of the impulse response or the time-reversed impulse response takes place in such a manner that only a portion in the time-reversed impulse response is attenuated to zero while other portions are not attenuated at all or are attenuated by a certain percentage to be above a value of zero. Other modifications are such that the whole portion before the maximum is attenuated, but is only attenuated in such a way that less than this whole portion is set to zero or any portion is not set to zero at all, but is attenuated by at least 10% with respect to the value before attenuation.

The relevant reflections are detected in the impulse response. These detected impulse responses may remain in the impulse response without significantly reducing the signal quality. Thus, the artifact detector 19 does not necessarily have to be a detector for artifacts, but may also be a detector for useful detections which means that non-useful reflections are considered to be artifact generating reflections which can be attenuated or eliminated by attenuating the amplitude of the impulse response associated with such a non-relevant reflection.

Thus, the energy radiated before the direct signal, i.e. before time $t_m$ can be reduced which results in an improvement of the signal quality.

Figure 4A:
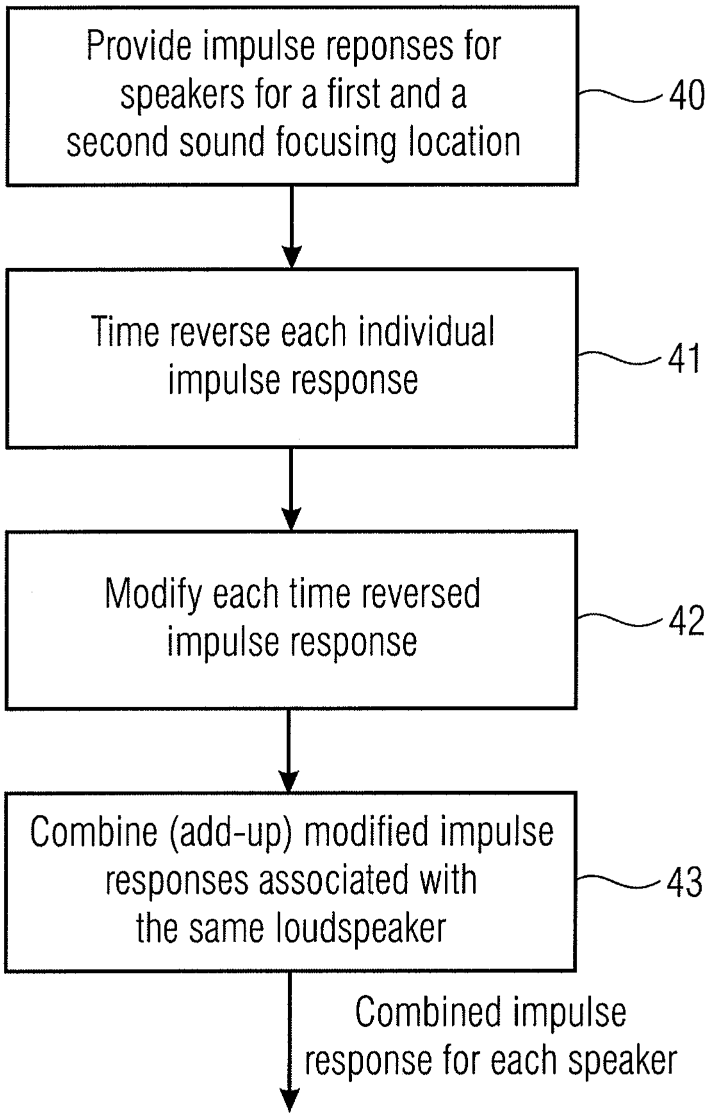
FIG. 4*a* illustrates a schematic representation of an implementation with more than one sound focusing location within a sound reproduction zone.

FIG. 4*a* illustrates an implementation of a process for generating a plurality of sound focusing locations as illustrated, for example, in FIG. 2. In a step 40, impulse responses for speakers for a first and a second and probably even more sound focusing locations are provided. When, for example, 20 loudspeakers are present, then 20 filter characteristics for one focusing zone are provided. When, therefore, there exist two sound focusing zones and loudspeakers, then step 40 results in the generation/provision of 40 filter characteristics. These filter characteristics are filter impulse responses. In step 41, all these 40 impulse responses are time-reversed. In step 42, each time-reversed impulse response is modified by any one of the procedures discussed in connection with FIG. 1 and FIGS. 3*a* to 3*f*. Then, in step 43, the modified impulse responses are combined. Specifically, the modified impulse responses associated with one and the same loudspeaker are combined and added up in a sample by some sample manner when the time impulse responses are given in a time-discrete form. In the example of two sound focusing zones and 20 loudspeakers, two modified impulse responses are added for one loudspeaker.

In an alternative embodiment, step 42 may be performed before step 41.

Furthermore, unmodified impulse responses can be added together, and subsequently, the modification of the combined impulse response for each speaker can be performed.

Thus, several focus points are simultaneously generated and the distance and quantity of focus points is determined by the intended coverage of the sound focusing zones. The super position of the focus points is to result in a broader focus zone.

In a further embodiment of the invention, the impulse responses obtained for a single focus zone are modified or smeared in time, in order to reduce the focusing effect. This will result in a broader focus zone. In an embodiment, the impulse responses are modified by an amplitude amount or time amount being less than 10 percent of the corresponding attitude before modification. The modification in time is even smaller than 10 percent of the time value such as one percent. The modification in time and amplitude is randomly or pseudo-randomly controlled or is controlled by a fully deterministic pattern, which can, for example, be generated empirically.

This procedure results in a spatially defined and constrained increase of the sound pressure around the small focus point, so that not only the point-like focusing zone is obtained, but a sound focusing having a larger area such as an area covering the head of a person is obtained. The sound energy concentration will, of course, not decrease abruptly. Therefore, a border of a sound focusing location can be defined by any measure such as the decrease of the sound energy by 50 percent compared to the maximum sound energy in the sound focusing location. Other measures can be applied as well in order to define the border of the sound-focusing zone.

Figure 4B:
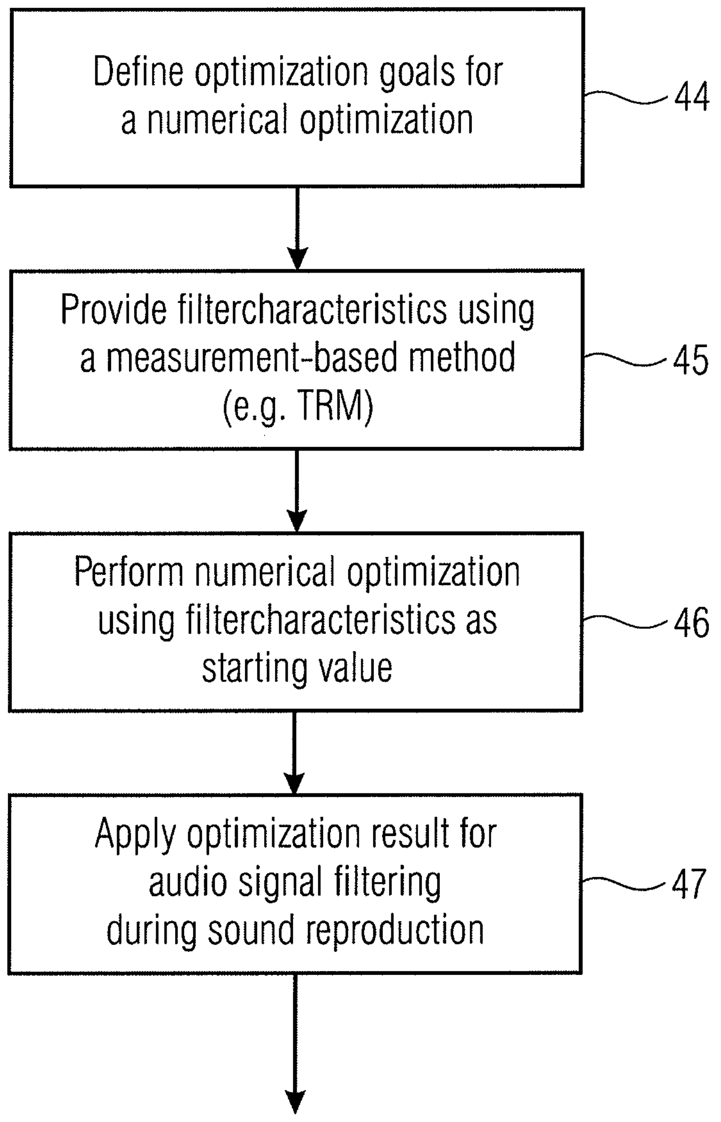
FIG. 4*b* illustrates a schematic representation of a process for generating starting values for a numerical optimization.

FIG. 4*b* illustrates further embodiments, which can, for example, be implemented in the processor 18 of FIG. 1. In step 44, optimization goals for a numerical optimization are defined. These optimization goals are sound energy values at certain spatial positions at focusing zones and, alternatively or additionally, positions with a significantly reduced sound energy, which should be placed at specific points. In step 45, filter characteristics for filters related to such optimization goals as determined in step 44 are provided using a measurement-based method such as the TRM-method discussed before. In step 46, the numerical optimization is performed using the measurement-based filter characteristics as starting values. In step 47, the optimization result, i.e., the filter characteristics as determined in step 46 are applied for audio signal filtering during sound reproduction. This procedure results in an improved convergence performance of the numerical optimization algorithm, such that smaller calculation times and, therefore, a better usage performance of the numerical optimization algorithm is obtained. A specific application is for mobile devices to the effect that the provision of filter characteristics which are based on a measurement method drastically reduces the calculation time amount, and therefore, the calculation resources. This procedure additionally results in a defined increase of the sound pressure for a certain frequency range which is defined by the available loudspeaker setup.

Figure 5A:
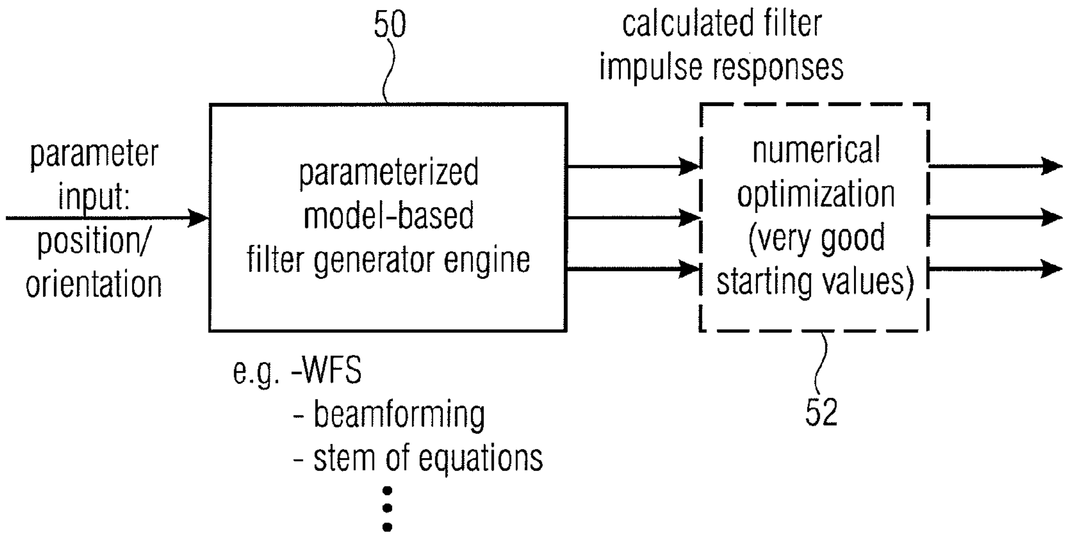
FIG. 5*a* illustrates an implementation of the filter characteristic generator for the embodiment in FIG. 2.

FIG. 5*a* illustrates a model-based implementation of the filter characteristic generator 24 in FIG. 2. Specifically, the filter characteristic generated 24 comprises a parameterized model-based filter generator engine 50. The generator engine 50 receives, as an input, a parameter such as the position or orientation parameter calculated by the image analyzer 23. Based on this parameter, the filter generator engine 50 generates and calculates the filter impulse responses using a model algorithm such as a wave field synthesis algorithm, a beam forming algorithm or a closed system of equations. The output of the filter generator engine can be applied directly for reproduction or can alternatively input into a numerical optimization engine 52 as starting values. Again, the starting values represent quite useful solutions, so that the numerical optimization has a high convergence performance.

Figure 5B:
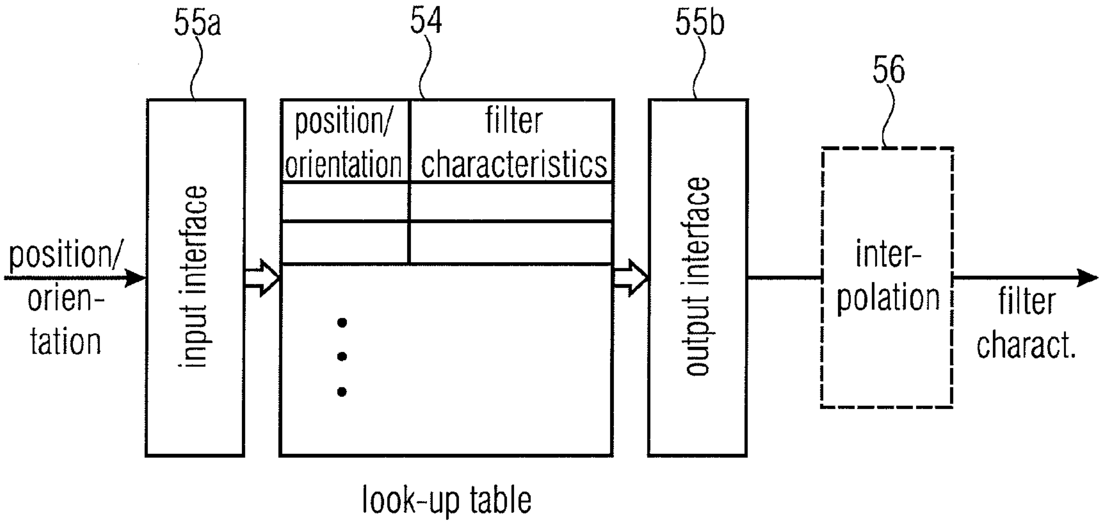
FIG. 5*b* illustrates an alternative implementation of the filter characteristic generator of FIG. 2.

FIG. 5*b* illustrates an alternative embodiment, in which the parameterized model-based filter generator engine 50 of FIG. 5*a* is replaced by a look-up table 54. The look-up table 54 might be organized as a database having an input interface 55*a* and an output interface 55*a* and an output interface 55*b*. The output of the database can be post-processed via an interpolator 56 or can be directly used as the filter characteristic or can be used as an input to a numerical optimizer as discussed in connection with item 52 of FIG. 5*a*. The look-up table 54 may be organized so that the filter characteristics for each loudspeaker are stored in relation to a certain position/orientation. Thus, a certain optically detected position or orientation of the head or the ears as illustrated in FIG. 2 is input into the interface 55*a*. Then, a database processor (not shown in FIG. 5*b*) searches for the filter characteristics corresponding to this position/orientation. The found filter characteristics are output via the output interface 55*b*. When the position/orientation has a value between two position/orientation values stored in the database, these two sets of filter characteristics can be output via the output interface and can be used for interpolation in the interpolator 56.

Figure 7A:
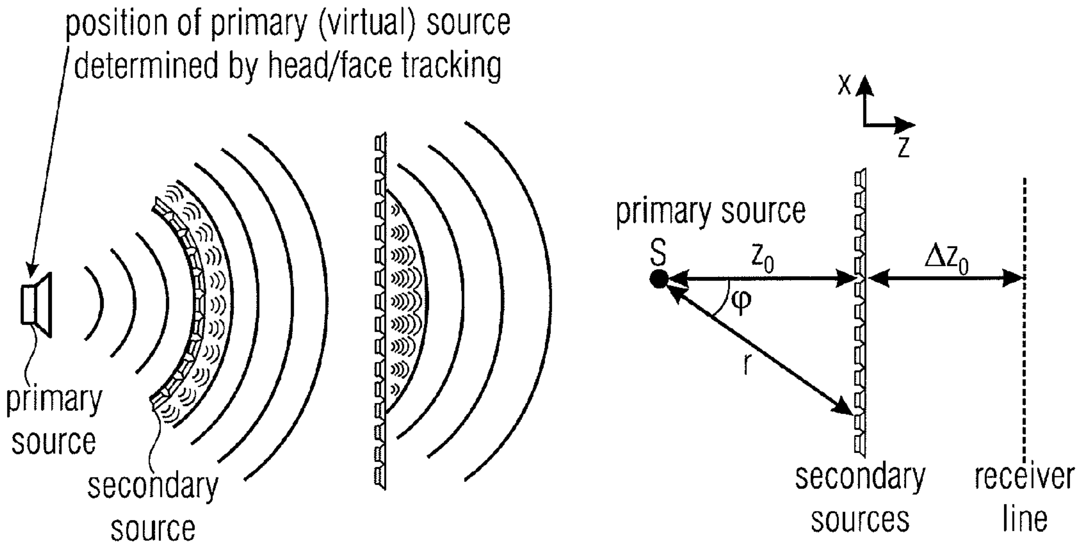
FIG. 7*a* is an illustration of Huygen's principle in the context of a wave field synthesis for the embodiment of FIG. 2.
Figure 7B:
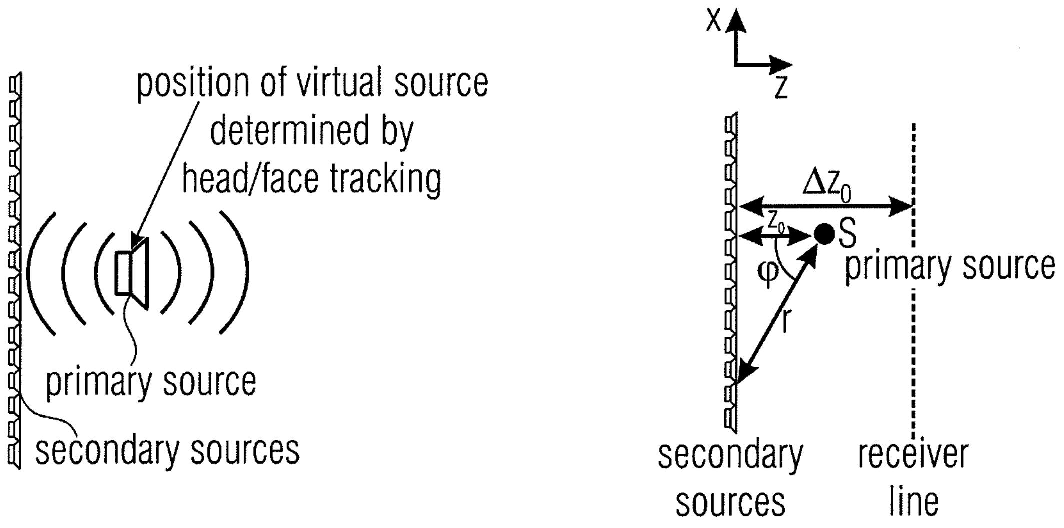
FIG. 7*b* illustrates the principle of a focus source (left) and the derivation of a 21/2-D focusing operator (right) for the embodiment of FIG. 2.
Figure 7C:
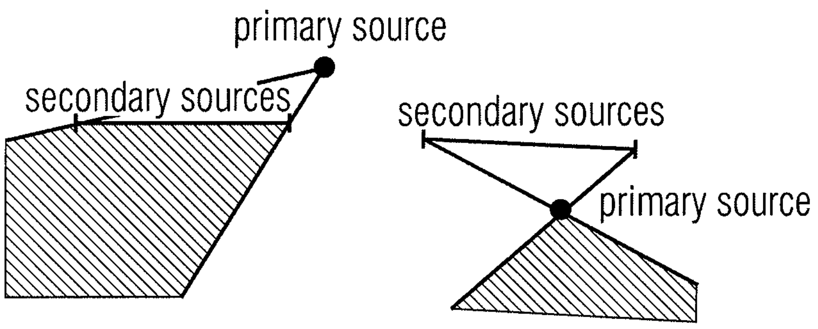
FIG. 7*c* illustrates the reproduction sounds for virtual sources positioned behind (left) and in front (right) of a speaker array for the embodiment of FIG. 2.

The wave field synthesis method is applied in the field characteristic generator 24 in FIG. 2 as discussed in more detail with respect to FIGS. 7*a* to 7*c*.

By applying the holographic approach to the acoustics, a new sound reproduction method called Wave Field Synthesis (WFS) was introduced during the late 1980'ies. As holophonic audio systems aim for the reconstruction of the original sound wave fronts over a wide listening area, WFS enables an accurate representation of the original wave filed with its natural temporal and spatial properties in the entire listening space and therefore offers a sophisticated listening experience.

The underlying physical principle for WFS is the Huygen's Principle (FIG. 7*a*-left). It states that every point on a wave curvature can be seen as the origin of another wave front. A superposition of these secondary wave fronts reproduces the wave field of the original (primary) source.

Arrays of closely spaced loudspeakers are used for the reproduction of the targeted (or primary) sound field. The audio signal for each loudspeaker is individually adjusted with well balanced gains and time delays, the WFS parameters, depending on the position of the primary and the secondary sources. For the calculation of these parameters an operator has been developed. The so called 21/2D-Operator (Eq.) is usable for two dimensional loudspeaker setups, which means that all loudspeakers are positioned in a plane defining the listening area (FIG. 7*a*-right).

Because of the time-invariant characteristics of the wave equation it is also possible to develop an operator which achieves the synthesis of an audio event located inside the listening area (Eq. in FIG. 7*b*). The loudspeaker array now emanates a concave wave front which is converging at one single point in space, the so called focal point. Beyond this point the wave front curvature is convex and divergent, which is the case for a "natural" point source. In fact of that, the so called focused source is correctly perceivable for listeners in front of the focus point (FIG. 7*c*).

A look at the formulation of the 21/2D-Operator for a focused source (see FIG. 7*b*) points out two main differences:

A modification of the frequency dependent part which results in a phase shift

A change in the exponent which is corresponding to concave wave front propagation Subsequently, the TRM technique (time-reversed mirror technique) is discussed in more detail with respect to FIGS. 8*a* and 8*b*.

Time-reversed acoustics is a general name for a wide variety of experiments and application in acoustics, all based on reversing the propagation time. The process can e used for time-reversal mirrors, to destroy kidney stones, detect defects in materials or to enhance underwater communication of submarines.

Time-reversed acoustics can also be applied to the audio range. Belonging on this principle focused audio events can be achieved in a reverberating environment.

The propagation of sound in air in a source free volume is given by the characteristic wave equation.

Time reversion of any physical process is regarding two assumptions. First of all, the physical process has to be invariant to time reversal which is the case for e.g. linear acoustics. As a second precondition it is necessitated to carefully take into account the boundary conditions of the process. Absorption will lead to a lack of information which will disturb the time reversed reconstruction process. This condition is hard to cover for real world implementations and leads to a need for some simplifications. Additionally absorption will lead to lack of information which will influence the time reversed reconstruction process.

Figures 8A, 8B:
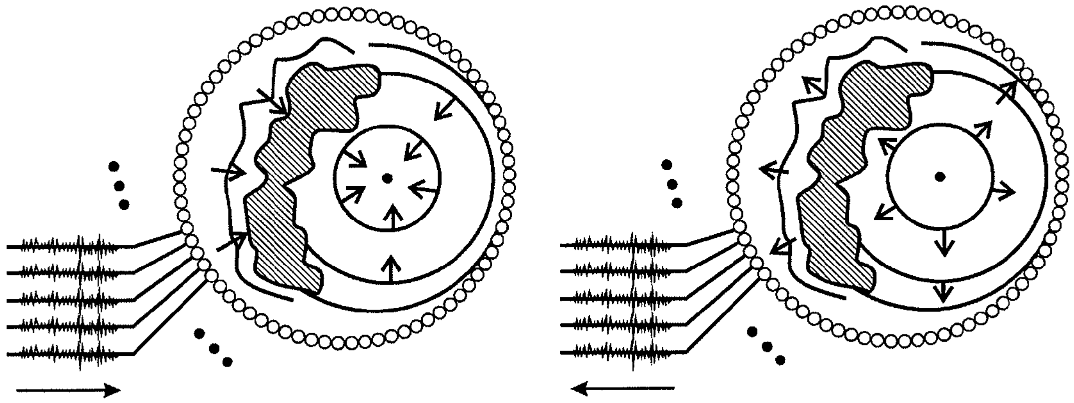
FIG. 8*a* illustrates the time-reversal mirroring (TRM) process comprising a recording task (left) and a playback task (right)
FIG. 8*b* illustrates calculations useful in obtaining the time-reversed/mirrored impulse response.

In FIG. 8*a* description of the time reversal process is depicted. Between the transducers and the source there can be a heterogeneous medium as well. The process can be divided into two subtasks:

Recording task: The source, which is located at the desired focal point, is emitting a sound. An acoustic wave front will propagate towards the source. This wave front has to be recorded at the volume boundary.

Playback task: In this step, the recorded audio signal is transmitted backwards, which means that a time reversed version of the signal is emitted from the volume boundary. The formed wave front will propagate in direction to the initial source and refocus at the original sources position creating a focused sound event.

With the Equations in FIG. 8*b* the implementation of a time reversal mirror can be described. In practice only the electro acoustic transfer function (EATF) $h_i$ (t) between the focal point and the loudspeakers has to be determined. During the playback step the time reversed EATF's $h_i$ (−t) are used as filters suitable for the convolution with any desired input signal x (t). Convolution is denoted by $\otimes$ in the following.

The result $r_i$ (t) of the playback step (Eq. in FIG. 8*b*) can also be interpreted as the spatial autocorrelation $h_{ac,I}$ (t) of the transfer function hi (t).

Subsequently, the numerical optimization/optimal control technique is discussed with respect to FIGS. 9 and 10.

Figure 9:
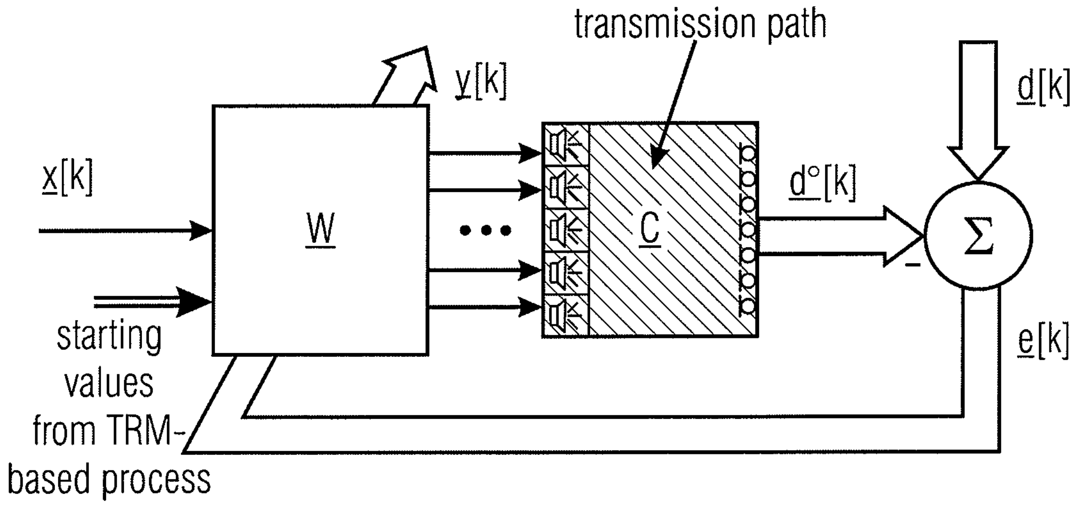
FIG. 9 illustrates a numerical model of sound propagation in a listening room, which is adapted for receiving starting values from measurement-based processes such as the TRM process.
Figure 10:
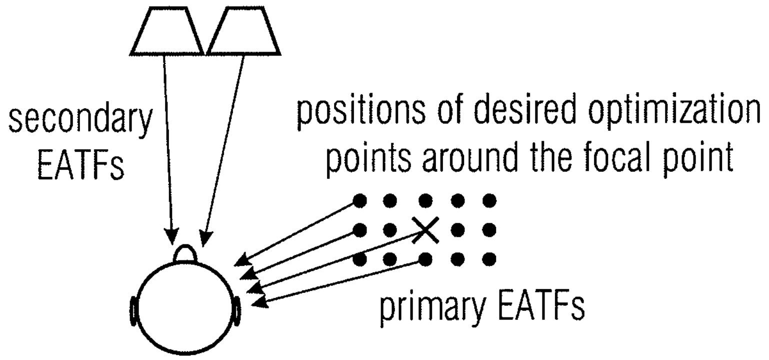
FIG. 10 illustrates the electro-acoustic transfer functions consisting of a primary function and a secondary function useful in the embodiment of FIG. 9.

Based on a numerical solution of the wave equation the sound propagation e.g. in a typical listening room can be modelled using a multidimensional linear equation system which describes the acoustic condition between a set of transducers and receivers (FIG. 9. A common approach for obtaining a desired sound field reproduction is to pre-filter the loudspeaker driving signals with suitable compensation filters.

The output signal y[k] is the result of a convolution of the input signal x[k] with the filter matrix W. During an optimization process the error output e[k] is used for the adaption of W to compensate for the real acoustic conditions.

Such "Multiple Input Multiple Output" systems (MIMO) are available from adaptive control techniques and suitable for the application to virtual acoustics. Optimization of inverse filter problems can be done by using several well-known approaches.

For the given problem one-step inversion approaches like "Multiple Input-Output Inverse Theory" (MINT) are not advantageous at this time. The size of the matrix W is defined by the number of loudspeakers and the length of the filters and therefore yields in a problem of main memory and processor power for a one-step inversion.

Using a "Multiple Error Least Mean Square" approach (ME-LMS) corrects for this problem because an iterative inversion process is used to solve for the inversion of W. To force the convergence of the native LMS optimization can be useful to introduce a spatial weighting factor with distinct to decrease the accuracy of the algorithm in points of less importance. The error-function e[k] than is altered.

The transmission path (FIG. 9) is characterized by the EATF between each loudspeaker (secondary source) and microphone (secondary EATF). The primary EATF's describe the desired sound propagation between the focal point (primary source) and the microphones. In case of a focal point at the listeners position the primary EATF can easily be calculated regarding the distance-law (FIG. 10).

By measurement the complete electro acoustic transfer function (secondary EATF) delivers a description of the transmission path C, including the loudspeaker characteristic. Additionally a target function (primary EATF) can be designed to define the desired sound filed reconstruction.

Subsequently, further alternatives for impulse response modification are discussed. One further embodiment not illustrated in FIGS. 3*a* to 3*f* is the filtering of the impulse response in order to extract noise from the impulse response. This filtering is performed to modify the impulse response so that only real peaks in the impulse response remain and the portions between peaks or before peaks are set to zero or are attenuated to a high degree. Thus, the modification of the impulse responses is a filtering operation, in which the portions between local maximums but not the local maximums themselves of the impulse response are attenuated or even eliminated, i.e., attenuated to zero.

Other modifications of the impulse response incur TRM methods based on the usage of microphone array measurements. In this embodiment, a microphone array is arranged around the desired sound focus point. Then, based on the impulse responses calculated for each microphone in the microphone array, desired impulse responses for certain focus points within the area defined by the microphone array are calculated. Specifically, the microphone array impulse responses are input into a calculation algorithm, which is adapted to additionally receive information on the specific focus point within the microphone array and information on certain spatial directions which are to be eliminated. Then, based on this information, which can also come from the camera system as illustrated in FIG. 2, the actual impulse responses or the actual time-inverted impulse responses are calculated.

When FIG. 1 is considered, the impulse responses generated for each microphone in the microphone array correspond to the output of the input response generator 12. The impulse response modifier 14 is represented by the algorithm which receives, as an input, a certain location and/or a certain preference/non-preference of a spatial direction, and the output of the impulse response modifier in the microphone array embodiment has the impulse responses or the inverted impulse responses.

Further embodiments of the FIG. 2 head/face tracking embodiment are operative to determine the position and orientation of the listener within the sound reproduction zone using at least one camera. Based on the position and orientation of the listener, model-based methods for generating a sound focusing location such as the beam forming and wave field synthesis are parametrically controlled such that at least one focus zone is modified in accordance with the detected listener position. The orientation of the focus zone can be oriented such that at least one listener receives a single-channel signal in a single zone or a multi-channel signal in several zones. Specifically, the usage of several cameras is useful.

Specifically, stereo camera systems in connection with methods for face recognition are advantageous. Such methods for image processing are performed by the image analyzer 23 of FIG. 2 based on the recognition of faces on pictures. Based on the analysis of a picture, a localization of the face in the room is performed. Based on the shape of the face, the detection of the direction of a view of the face/person or the position and orientation of the ears of the person is possible.

These picture performances can be obtained by using single objective camera systems. When, however, camera systems having multiple cameras are used for face tracking, a more accurate determination of location and orientation of the face or the head or the ears of the listener is performed based on the additional amount of data to be analyzed. Using stereo camera systems which operate similar to the human visual system, several images can be compared and can be used for a determination of deepness/distance information. Therefore, the image analyzer 23 is operative to perform a face detection in pictures provided by the camera system 22 and to determine the orientation or location of the head/the ears of the person based on the results of the face detection.

In a further embodiment of the sound reproduction system the image analyzer 23 is operative to analyze an image using a face detection algorithm, wherein the image analyzer is operative to determine a position of a detected face within the reproduction zone using the position of the camera with respect to the sound reproduction zone.

In a further embodiment of the sound reproduction system the image analyzer 23 is operative to perform an image detection algorithm for detecting a face within the image, wherein the image analyzer 23 is operative to analyze the detected face using geometrical information derived from the face, wherein the image analyzer 23 is operative to determine an orientation of a head based on the geometrical information.

In a further embodiment of the sound reproduction system the image analyzer 23 is operative to compare a detected geometrical information from the face to a set of pre-stored geometrical information in a database, wherein each pre-stored geometrical information has associated therewith an orientation information, and wherein an orientation information associated with the geometrical information best matching with the detected geometrical information is output with the orientation information.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for generating filter characteristics for filters connectible to at least three loudspeakers at defined locations with respect to a sound reproduction zone, comprising:

an impulse response reverser device for time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and an impulse response modifier device for modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the impulse response modifier device is operative to reduce a portion of the time-reversed impulse response or the impulse response before time-reversal in accordance with a monotonically decreasing function, the portion occurring immediately before a maximum of the time-reversed impulse response, and wherein the monotonically increasing function is derived from a pre-masking characteristic of a human hearing system.

2. Apparatus in accordance with claim 1, in which the impulse response modifier device is operative to modify such that the modified time-reversed impulse response comprises amplitude values below 50 percent of the maximum at a time distance of between 20 ms and 50 ms to a time of the maximum of the impulse response.

3. Apparatus in accordance with claim 1, further comprising:

a detector for detecting portions of the impulse responses or time-reversed impulse responses, which cause useful reflections or which cause pre-echos at the sound focusing location, wherein the impulse response modifier device is operative to modify, in response to a detector output, so that portions in the impulse response not related to useful reflections are attenuated.

4. Apparatus in accordance with claim 1, in which the impulse response modifier device is operative to not perform a modification which would result in a modification of the time-reversed impulse response subsequent in time to a time of the maximum.

5. Apparatus in accordance with claim 1, in which the impulse response modifier device is operative to determine local peaks in the time-reversed impulse response or the impulse response before time-reversal, and to not attenuate the local peaks and to attenuate portions between two local peaks or to attenuate the two local peaks with a first degree and to attenuate the portion between the two local peaks with a second degree greater than the first degree.

6. Apparatus in accordance with claim 5, in which the impulse response modifier device is operative to attenuate the portions between the peaks by applying a first time constant comprising a first value before a peak with respect to the time-reversed impulse response and by applying a second time constant comprising a second value subsequent to the peak with respect to the time-reversed impulse response, the second value being greater than the first value.

7. Apparatus in accordance with claim 1, in which the sound reproduction zone comprises at least two spatially different zone focusing locations, in which the impulse response reverser device is operative to time-reverse an impulse response for each sound focusing location to each loudspeaker of the at least three loudspeakers, and wherein the impulse response modifier device is operative to modify each impulse response or each time-reversed impulse response individually, before modified impulse responses or modified time-reversed impulse responses for sound transmission channels to a loudspeaker of the at least three loudspeakers are combined, or wherein a combined impulse response or a combined time-reversed impulse response is derived by combining the impulse responses or the time-reversed impulse responses associated with sound transmission channels to the same loudspeaker of the at least three loudspeakers, wherein the impulse response modifier device is operative to perform a modification using the combined impulse response or the combined time-reversed impulse response.

8. Apparatus in accordance with claim 7, in which the sound focusing locations comprise a distance approximating a distance between ears of a human head or a human head model.

9. Apparatus in accordance with claim 7, in which at least three sound focusing locations are distributed in a predefined sound focusing location area being smaller than the sound reproduction zone defined by the at least three loudspeakers, wherein the sound focusing locations are so close to each other that a specified portion between the sound focusing locations comprises a sound energy, which is higher than outside the sound focusing area by at least 50 percent.

10. Apparatus in accordance with claim 1, further comprising a processor comprising a numerical optimizer adapted to optimize starting values for filter coefficients in order to acquire an optimum matching of an actual sound energy focusing characteristic to a desired sound focusing characteristic at one or more sound focusing locations in an iterative procedure, and wherein modified and reversed impulse responses are used as the starting values for the iterative procedure.

11. Method of generating filter characteristics for filters connectible to at least three loudspeakers at defined locations with respect to a sound reproduction zone, comprising:

time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the modifying comprises reducing a portion of the time-reversed impulse response or the impulse response before time-reversal in accordance with a monotonically decreasing function, the portion occurring immediately before a maximum of the time-reversed impulse response, and wherein the monotonically increasing function is derived from a premasking characteristic of a human hearing system.

12. A non-transitory storage medium having stored thereon a computer program comprising a program code for performing, when running on a computer, the method of generating filter characteristics for filters connectible to at least three loudspeakers at defined locations with respect to a sound reproduction zone, the method comprising:

time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the modifying comprises reducing a portion of the time-reversed impulse response or the impulse response before time-reversal in accordance with a monotonically decreasing function, the portion occurring immediately before a maximum of the time-reversed impulse response, and wherein the monotonically increasing function is derived from a premasking characteristic of a human hearing system.

13. Sound reproduction system, comprising:

an apparatus for generating filter characteristics for filters connectible to at least three loudspeakers at defined locations with respect to a sound reproduction zone, the apparatus comprising:

an impulse response reverser device for time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and an impulse response modifier device for modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the modifying comprises reducing a portion of the time-reversed impulse response or the impulse response before time-reversal in accordance with a monotonically decreasing function, the portion occurring immediately before a maximum of the time-reversed impulse response, and wherein the monotonically increasing function is derived from a premasking characteristic of a human hearing system; and a plurality of programmable filters programmed to the filter characteristics determined by the apparatus for generating the filter characteristics of the at least three loudspeakers at predefined locations, wherein each loudspeaker of the at least three loudspeakers is connected to one of the plurality of filters; and an audio source connected to the filters.

14. Apparatus for generating filter characteristics for filters connectible to at least three loudspeakers at defined locations with respect to a sound reproduction zone, comprising:

an impulse response reverser device for time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and an impulse response modifier device for modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the impulse response modifier device is operative to determine local peaks in the time-reversed impulse response or the impulse response before time-reversal, and to not attenuate the local peaks and to attenuate portions between two local peaks or to attenuate the local peaks with a first degree and to attenuate the portion between the two local peaks with a second degree greater than the first degree.

15. Apparatus for generating filter characteristics for filters connectible to at least three loudspeakers at defined locations with respect to a sound reproduction zone, comprising:

an impulse response reverser device for time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and an impulse response modifier device for modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the sound reproduction zone comprises at least two spatially different zone focusing locations, wherein the impulse response reverser device is operative to time-reverse an impulse response for each sound focusing location to each loudspeaker of the at least three loudspeakers, and wherein the impulse response modifier device is operative to modify each impulse response or each time-reversed impulse response individually, before modified impulse responses or modified time-reversed impulse responses for sound transmission channels to a loudspeaker of the at least three loudspeakers are combined, or wherein a combined impulse response or a combined time-reversed impulse response is derived by combining the impulse responses or time-reversed impulse responses associated with sound transmission channels to the same loudspeaker of the at least three loudspeakers, wherein the impulse response modifier device is operative to perform a modification using the combined impulse response or the combined time-reversed impulse response.

16. Method of generating filter characteristics for filters connectible to at least three loudspeakers at defined locations with respect to a sound reproduction zone, comprising:

time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the modifying comprises determining local peaks in the time-reversed impulse response or the impulse response before time-reversal, and not attenuating the local peaks and attenuating portions between two local peaks or attenuating the local peaks with a first degree and attenuating the portion between the two local peaks with a second degree greater than the first degree.

17. Method of generating filter characteristics for filters connectible to at least three loudspeakers at defined locations with respect to a sound reproduction zone, comprising:

time-reversing impulse responses associated to the at least three loudspeakers to acquire time-reversed impulse responses, wherein each impulse response describes a sound transmission channel between a location within the sound reproduction zone and a loudspeaker of the at least three loudspeakers, which has the impulse response associated therewith; and modifying the time-reversed impulse responses or the impulse responses associated to the at least three loudspeakers before inversion, such that impulse response portions occurring before a maximum of a time-reversed impulse response are reduced in amplitude to acquire the filter characteristics for the filters, wherein the sound reproduction zone comprises at least two spatially different zone focusing locations, wherein the time-reversing comprises time-reversing an impulse response for each sound focusing location to each loudspeaker of the at least three loudspeakers, and wherein the modifying comprises modifying each impulse response or each time-reversed impulse response individually, before modified impulse responses or modified time-reversed impulse responses for sound transmission channels to a loudspeaker of the at least three loudspeakers are combined, or wherein, a combined impulse response or a combined time-reversed impulse response is derived by combining the impulse responses or time-reversed impulse responses associated with sound transmission channels to the same loudspeaker of the at least three loudspeakers, wherein the modifying comprises performing a modification using the combined impulse response or the combined time-reversed impulse response.

* * * * *